United States Patent [19]
Haldas et al.

[11] 3,767,433
[45] Oct. 23, 1973

[54] CEMENT COMPOSITIONS AND METHODS

[75] Inventors: Walter J. Haldas; Jesse A. Faust, both of Houston, Tex.

[73] Assignee: Lone Star Cement Corporation, Houston, Tex.

[22] Filed: Jan. 25, 1971

[21] Appl. No.: 109,606

[52] U.S. Cl.................. 106/89, 106/90, 106/97, 106/98
[51] Int. Cl.............................................. C04b 7/02
[58] Field of Search .................... 106/85, 89, 90, 97, 106/314, 315, 98, 102

[56] References Cited
UNITED STATES PATENTS

| | | | |
|---|---|---|---|
| 3,131,075 | 4/1964 | Brooks | 106/98 |
| 2,805,719 | 9/1957 | Anderson | 106/98 |
| 2,654,674 | 10/1953 | Frankenhoff | 106/98 |
| 2,348,614 | 5/1944 | Dinkfeld | 106/85 |
| 1,976,133 | 10/1934 | Larmour et al. | 106/102 |
| 2,085,044 | 6/1937 | Roller | 106/102 |

FOREIGN PATENTS OR APPLICATIONS

| | | | |
|---|---|---|---|
| 1,505,381 | 12/1967 | France | 106/102 |

OTHER PUBLICATIONS

Tea & Desch, "The Chemistry of Cement and Concrete," Edw. Arnold Sons, pg. 466 (1956).

*Primary Examiner*—James E. Poer
*Attorney*—James F. Weiler, Jefferson D. Giller, William A. Stout, Paul L. De Verter, II, Dudley R. Dobie, Jr. and Henry W. Hope

[57] ABSTRACT

A "basic" cement of enhanced properties particularly useful in the cementing of wells, methods of making it, and methods of cementing geologic formations traversed by well bores are disclosed. The cement composition comprises a hydraulic cement intimately pretreated with a small amount of water and aged or cured for at least 30 minutes. The preferred amount of water is from about 0.5 percent to about 1.0 percent by weight of the cement; although higher and lesser amounts of water may be used. As much as about 5% water is satisfactory if the aged cement is used within a relatively short period of time, but there should not be enough water added to provide substantial lumping or hydration of the cement. The "basic" cement composition when pretreated with water has good compatibility with various additives, retarders and the like, good viscosity and strength, increased thickening times, and a reduced amount of mix water may be used thereby increasing the weight of the cement slurry.

The method of preparing the cement composition includes pretreating a hydraulic cement by intimately mixing, preferably with a fine spray, a small amount of water, as indicated in the amounts above, and aging or curing for at least 30 minutes before use. The water can also be incorporated in the cement by adding the small amount of water to an inert carrier, such as Diatomaceous silica then intimately mixing the carrier with the cement and aging or curing for at least 30 minutes. The method includes adding various additives as desired, such as retarders and the like.

The method of performing cementing operations in geologic formations comprises placing the cement composition in such formations for bonding and plugging purposes. There are a number of examples disclosed giving the cement composition, and methods of making and using it.

21 Claims, No Drawings

CEMENT COMPOSITIONS AND METHODS

BACKGROUND OF THE INVENTION

The cement composition of this invention has special utility in cementing geologic formations traversed by well bores, such as in the drilling of oil and gas wells. Accordingly, the invention is described in connection with such cementing operations; although, other uses of the invention may be made.

There has been a need for a cement composition that can be used to cement wells drilled from the surface to depths beyond 16,000 feet in search of oil and gas. Such a cement composition ideally should have a thickening time of about 3 to 4 hours at any specified depth, ample strength development, low slurry viscosity, should be compatible with sea water, as a great many wells are cemented offshore where it is advantageous to use sea water as mix water (such as in the Gulf of Mexico), and should be compatible with retarders, additives, and the like used in cement compositions in cementing such wells.

The present invention is directed to such a cement composition and method.

The inventors are not aware of any prior patents, publication or use in which cement is treated, prepared and used in accordance with the present invention; that is, intimately mixed with a small amount of water and aged for 30 minutes before use or normal hydration. The inventors are aware of U. S. Pat. No. 3,429,726 granted Feb. 25, 1969, in which a slime or paste of cement is first made and the slime or paste is then hydrated. Also, the inventors are aware of U.S. Pat. No. 1,712,818 of May 14, 1929, in which cement is ground to small particles and these small particles are reacted quantatively with water. In neither of these patents, however, is there a suggestion or disclosure of pretreating cement with a small amount of water in accordance with the present invention and aging or curing for at least 30 minutes before use or hydration.

SUMMARY

The present invention relates to a cement composition useful as a "basic" cement in cement slurries used for cementing geologic formations traversed by well bores, to methods of making it, and methods of cementing the geologic formations traversed by the bore hole with it. More particularly, the cement compositions, their methods of making and their methods of use, relate to a cement which by a simple and inexpensive pretreatment provide a "basic" cement composition.

Accordingly, it is an object of the present invention to provide a cement composition having enhanced and improved properties.

It is a further object of the present invention to provide a cement composition, a "basic" cement which when used in cement slurries, has enhanced and improved properties.

A further object of the present invention is the provision of a cement composition, a "basic" cement, which when used in cement slurries for cementing formations traversed by a well bore, has enhanced compatibility with additives, such as retarders, has a thickening time of at least about 3 hours or, preferably, from about 3 to 4 hours, at depths up to and beyond 20,000 feet, when used with suitable retarders, ample strength development, and low viscosity.

A further object of the present invention is the provision of such a "basic" cement composition which when used in cement slurries permits the use of less mix water and which has a slurry weight of at least 17 pounds per gallon and having low viscosity and the other enhanced properties previously set forth.

A further object of the present invention is the provision of a "basic" cement which may be made and which has a long shelf life without any deleterious effect and which can be provided for use at any desired time after pretreatment and aging as the "basic" cement in cement slurries and has enhanced properties, as set forth.

A further object of the present invention is the provision of such a "basic" cement composition which is compatible with sea water so that in drilling offshore wells, sea water may be used as the mix water thereby eliminating the expense and trouble of providing "fresh" water.

A further object of the present invention is a simple and inexpensive method of making the "basic" cement composition of the invention.

A further object of the invention is the provision of a method of cementing formations traversed by a well bore utilizing the "basic" cement composition of the invention.

A further object of the present invention is the provision of a cement slurry having low viscosity, good strength, ideal thickening times at depths up to and over 20,000 feet, when used with suitable retarders, its method of preparation, and method of cementing formations traversed by a well bore with the cement slurry.

Other and further objects, features and advantages will be apparent from the following description of presently-preferred embodiments of the invention.

DESCRIPTION OF THE PREFERRED EMBODIMENTS

The cement composition of the present invention may be considered as a "basic" cement composition for making cement slurries for cementing geologic formations at depths down to and exceeding 20,000 feet when used with suitable retarders. This "basic" cement composition which has excellent compatibility with additives comprises an inorganic cement intimately mixed with a small amount of water, from about 0.25 percent up to about 5 percent by weight of the cement, and preferably from about 0.5 percent to about 1 percent water by weight, intimately mixed with the cement and aged or cured for at least 30 minutes. The amount of water added should not provide substantial lumping, and if the higher amounts of water are used, preferably a cement slurry including the "basic" cement composition should be made and used promptly after aging or curing since the higher amounts of water addition increase the thickening time of the cement with storage. However, the use of about 0.5 percent water minimizes these disadvantages and permits attainment of ideal thickening times.

The "basic" cement composition is dry and unhydrated. It is not a slime or a paste.

The present invention is applicable to all cementitious systems comprising hydraulic cement. The term "hydraulic cement" is recognized in the art as defining a definite class and it is intended to cover all members of this class. Hydraulic cements include, but are not limited to, the portland cements, the natural cements, the white cements, the aluminous cements, the grappier cements, the hydraulic limes and the pozzolanic cements including those derived from industrial slags. The hydraulic cement which is most widely used, because of its amenability to low cost production, is portland cement.

If desired, various additives may be added to the "basic" cement or cement slurry. One of the features and advantages of the invention is that a cement which without pretreatment has poor compatibility with available additives has significantly improved compatibility with such additives after pretreatment and aging according to the invention. Any of the various additives used in the cementing of oil wells may be used, such as those listed in the November-December, 1963 issue of Petroleum Equipment published by Special Associated Publishers, Inc. on pages 18, 19 and 20. Especially good results have been obtained by using the retarders in our co-pending applications, Ser. No. 131,514 filed 4/5/71 and Ser. No. 131,515 filed 4/5/71.

The method of making the basic cement composition having the improved and enhanced properties mentioned is by intimately mixing hydraulic cement with from about 0.25 to about 5.0 percent water, which preferably is added in the form of a fine spray or a mist. Preferably 0.5 to 1.0 percent water by weight of the cement is added. The cement is then permitted to age or cure for a period of 30 minutes or more. Substantial lumping should be avoided and the cement when aged should be in substantially dry form. Any desired type of mixing and spraying or misting equipment and containers may be used. Advantageously, the method may be performed at atmospheric pressures and under normal temperature conditions. Any suitable type of mixing equipment can be used which will allow intimate blending of the cement and water, such as ribbon-type mixers, turbo-mixers, ball mills, twin-screw mixers or any of the various types of liquid/solid blenders that are available to the art. What is desired, is for the water to be intimately and thoroughly dispersed in the cement powder. Thus, a very simple and inexpensive method of making the "basic" cement composition of the invention is provided.

The cement slurry is made by hydrating the "basic" cement composition with mix water. Any desired amount of mix water may be used, and, advantageously, less mix water may be used than when using conventional cements. Ordinarily the mix water will be in the range as specified in API Std 10A. However, with the pretreated cement the mix water can be reduced approximately 25 percent. As previously mentioned, the mix water may be "fresh" or sea water. Additives such as retarders and the like are added to the cement or to the cement slurry as desired.

The following examples and tables are illustrative of the invention in which API casing and squeeze schedules (as specified in API RP 10B) were used and the retarders are based on the weight of the dry cement.

EXAMPLE I

In this example, a comparision of cement slurries was made using an API Class H cement in a 38 percent water slurry and the same cement pretreated with 0.5 percent water and aged for at least 30 minutes to form a "basic" cement, according to the invention, in a 38 percent water slurry. No retarders, additives and the like were added to the cement. The results are set forth in the following Table I.

TABLE I

| | No pretreatment of cement | | | Cement pretreated with 0.5 percent water and aged for at least 30 minutes | | |
|---|---|---|---|---|---|---|
| Casing depth (ft.) | Initial viscosity consistency units (Uc) | Thickening time to 70 Uc | Test | Initial viscosity consistency units (Uc) | Thickening time to 70 Uc | Test |
| 2,000 | 14 | 4:57 | 1 | 17 | 7:32 | 1a |
| 4,000 | 17 | 3:41 | 2 | 16 | 5:10 | 2a |
| 6,000 | 18 | 2:33 | 3 | 16 | 3:30 | 3a |
| 8,000 | 20 | 1:37 | 4 | 17 | 2:24 | 4a |
| 10,000 | 21 | 1:21 | 5 | 16 | 1:47 | 5a |

The test results in Table I indicate that the thickening time of the pretreated cement was increased considerably over that obtained with cement not pretreated. The viscosity of the cement slurries made with the pretreated cement was as low, or lower than those of the cement slurries made with untreated cement.

EXAMPLE II

In this example, a readily available commercial API Class H cement was used to which various amounts of a widely used retarder, D-28R was employed as set forth in Table II. One of the cements had no pretreatment and the other was pretreated with 0.5 percent water and aged for at least 30 minutes. A comparison of the results of cement slurries with these cements, retarders and 38 percent mix water is set forth in the following Table II.

TABLE II

| | | No pretreatment of cement | | | Cement pretreated with 0.5 percent water and aged for at least 30 minutes | | |
|---|---|---|---|---|---|---|---|
| Squeeze depth (ft.) | Percent D28R | Initial viscosity consistency units (Uc) | Thickening time to 70 Uc | Test | Initial viscosity consistency units (Uc) | Thickening time to 70 Uc | Test |
| 12,000 | 0.06 | 20 | 1:47 | 1 | 6 | 3:13 | 1a |
| 14,000 | 0.15 | 12 | 1:50 | 2 | 10 | 3:15 | 2a |
| 16,000 | 0.50 | 12 | 2:36 | 3 | 12 | 2:40 | 3a |
| 18,000 | 1.20 | 12 | 8:00 | 4 | 7 | 4:02 | 4a |

From the foregoing Table II, it is noted that the cement treated with 0.5 percent water and aged for at least 30 minutes had ideal thickening times at the various depths indicated, and had low initial viscosity; whereas, the cement slurry utilizing the cement not pretreated in accordance with the invention had poor thickening times and generally higher initial viscosities.

EXAMPLE III

In this example, the same cements were used in making a cement slurry with 38 percent mix water as in Example II, but HR-12, a widely used retarder, was used as the retarder. A comparison of the thickening times and viscosities of these cement slurries is set forth in the following Table III.

that the cement slurry using the "basic" cement composition of the present invention had ideal thickening times and good viscosity at all depths; whereas, the thickening times were not all ideal and the viscosities were not as good at all depths with the cement slurry utilizing the conventional cement.

EXAMPLE V

In this example, the same cements, both untreated and treated according to the present invention as in the previous examples, were used in forming a cement slurry with 38% water. HR-4, a widely-used retarder, was used as the retarder. The results are set forth in the following Table V.

TABLE V

| Squeeze depth (ft.) | No pretreatment of cement | | | | Cement pretreated with 0.5 percent water and aged for at least 30 minutes | | |
|---|---|---|---|---|---|---|---|
| | Percent HR-4 | Initial viscosity consistency units (Uc) | Thickening time to 70 Uc | Test | Initial viscosity consistency units (Uc) | Thickening time to 70 Uc | Test |
| 6,000 | 0.10 | 17 | 2:00 | 1 | 12 | 3:42 | 1a |
| 8,000 | 0.10 | 23 | 1:42 | 2 | 14 | 2:53 | 2a |
| 10,000 | 0.15 | 16 | 2:30 | 3 | 16 | 3:48 | 3a |
| 12,000 | 0.30 | 16 | 1:35 | 4 | 5 | 3:14 | 4a |

TABLE III

| Squeeze depth (ft.) | No pretreatment of cement | | | | Cement pretreated with 0.5 percent water and aged for at least 30 minutes | | |
|---|---|---|---|---|---|---|---|
| | Percent HR-12 | Initial viscosity consistency units (Uc) | Thickening time to 70 Uc | Test | Initial viscosity consistency units (Uc) | Thickening time to 70 Uc | Test |
| 12,000 | 0.15 | 24 | 1:58 | 1 | 12 | 4:06 | 1a |
| 14,000 | 0.25 | 16 | 1:20 | 2 | 12 | 3:08 | 2a |
| 16,000 | 0.45 | 8 | 1:53 | 3 | 8 | 3:41 | 3a |
| 18,000 | 1.30 | 11 | 3:30 | 4 | 5 | 2:57 | 4a |

From the foregoing Table III, it is noted that a cement slurry using a basic cement composition according to the invention had ideal setting times of between about 3 and 4 hours and low viscosity; whereas, the conventional cement did not have ideal setting times and in all but one instance had substantially higher viscosities.

EXAMPLE IV

In this example, CMHEC (carboxy methyl hydroxyethyl cellulose), a widely used retarder was substituted for the retarder of Example III, to form the slurry as set forth in the following Table IV.

From the data as set forth in Table V it is seen that the cement slurry having the "basic" cement according to the invention had ideal setting times and low viscosities at all squeeze depths; whereas, the cement slurry made with the conventional cement did not have such good thickening times and low viscosities.

EXAMPLE VI

In this example, the same two cements used as in the preceeding example were used except that a calcium lignosulfonate, a well known commercial retarder in use and available on the market was substituted for HR-4. A comparison of the results is set forth in the following Table VI.

TABLE IV

| Squeeze depth (ft.) | No pretreatment of cement | | | | | Cement pretreated with 0.5 percent water and aged for at least 30 minutes | | |
|---|---|---|---|---|---|---|---|---|
| | Percent CMHEC | Percent mix water | Initial viscosity consistency units (Uc) | Thickening time to 70 (Uc) | Test | Initial viscosity consistency units (Uc) | Thickening time to 70 (Uc) | Test |
| 12,000 | 0.15 | 38 | 12 | 1:30 | 1 | 16 | 3:47 | 1a |
| 14,000 | 1.00 | 38 | 16 | 2:44 | 2 | 16 | 3:00 | 2a |
| 16,000 | 2.50 | 50 | 28 | 3:48 | 3 | 17 | 2:50 | 3a |
| 18,000 | 3.50 | 50 | 25 | 3:24 | 4 | 17 | 3:01 | 4a |

From the data in the foregoing Table IV, it is noted

TABLE VI

| | No pretreatment of cement | | | | Cement pretreated with 0.5 percent water and aged for at least 30 minutes | | |
|---|---|---|---|---|---|---|---|
| Squeeze depth (ft.) | Percent calcium ligno- sulfonate | Initial viscosity consistency units (Uc) | Thicken- ing time to 70 Uc | Test | Initial viscosity consistency units (Uc) | Thicken- ing time to 70 Uc | Test |
| 6,000 | 0.10 | 19 | 1:40 | 1 | 12 | 3:30 | 1a |
| 8,000 | 0.15 | 23 | 1:54 | 2 | 12 | 3:56 | 2a |
| 10,000 | 0.15 | 11 | 2:06 | 3 | 18 | 3:10 | 3a |
| 12,000 | 0.40 | 13 | 1:44 | 4 | 8 | 3:08 | 4a |

From the data as set forth in Table VI, it is seen that the cement slurry utilizing the "basic" cement according to the invention had ideal thickening times and good viscosities; whereas, the cement slurry utilizing the conventional cement had rather poor thickening times and, in all but one instance, higher viscosities.

EXAMPLE VII

In this example, no retarder was used and the amount of water was varied from none up to 5.00 percent and the pretreated cement was aged from 30 minutes up to five days. API Class H cement was used, the thickening time was at 8,000 feet casing test depth and 38 percent mix water was used.

TABLE VII

| Treatment Water % | Age of Pretreated Cement | | | |
|---|---|---|---|---|
| | 30 min. | 1 day | 3 days | 5 days |
| 0 | 1:37 | — | — | — |
| 0.25 | 2:08 | 2:14 | 2.26 | 2:19 |
| 1.00 | 3:02 | 3:50 | 4:05 | 5:02 |
| 5.00 | 3:14 | 4:13 | 3:29 | 4:37 |

From the data in Table VII, it is seen that the cement slurry utilizing the pretreated cement aged for different periods had improved thickening times.

EXAMPLE VIII

In this example, the same cement as in Example VII was used and 0.40% calcium lignosulfonate was used with 38 percent mix water. The pretreated cement was aged for 30 minutes. The thickening times in the following Table VIII are at 12,000 ft. squeeze test depth.

TABLE VIII

| Treatment Water % | 30 minute aging Initial Viscosity (Consistency Units) Uc | Thickening Time (To 70 Uc) |
|---|---|---|
| 0 | 13 | 1:44 |
| 0.25 | 13 | 0.51 |
| 0.50 | 8 | 2:50 |
| 1.00 | 9 | 6:52 |
| 5.00 | 8 | 9:18 |

From the data in Table VIII, it is seen that when a retarder is added to the cement slurry utilizing the pretreated cement aged for different periods the resulting cement slurry generally had increased thickening time.

EXAMPLE IX

In this example, the same cement slurry was used as in Example VIII, but with 0.5% calcium lignosulfonate and sea water was used as the mix water. The following Table IX sets forth the thickening times at 12,000 ft. squeeze test depth.

TABLE IX

| Treatment Water % | 30 minute aging Initial Viscosity (Consistency Units) Uc | Thickening Time (To 70 Uc) |
|---|---|---|
| 0 | 18 | 2:31 |
| 0.25 | 15 | 1:42 |
| 0.50 | 5 | 2:33 |
| 1.00 | 10 | 3:49 |
| 5.00 | 5 | 6:31 |

From the data in Table IX, it is seen that, in general, the thickening time was improved by the pretreatment, and while the thickening time with 0.5 percent water was approximately the same as no pretreatment with water, the viscosity of the pretreated cement was lower.

EXAMPLE X

In this example, an API Class A cement with 46 percent mix water, and an API Class C cement (HSR) with 56 percent mix water, untreated and pretreated with 0.5 percent water and aged for 30 minutes were compared, as set forth in the following Table X.

TABLE X

| | Thickening time (to 70 Uc) | | | | | | |
|---|---|---|---|---|---|---|---|
| | API class A cement (46 percent mix water) | | | | API class C cement (56 percent mix water) | | |
| | Cement not treated | | Cement treated with 0.5 percent water | | Cement not treated | | Cement treated with 0.5 percent water | |
| API casing schedules depth (ft.) | Visc. | Thicken- ing time | Visc. | Thicken- ing time | Visc. | Thicken- ing time | Visc. | Thicken- ing time |
| 4,000 | 14 | 3:11 | 12 | 4:25 | 10 | 3:49 | 12 | 4:30 |
| 6,000 | 14 | 2:20 | 12 | 3:04 | 7 | 2:52 | 8 | 3:02 |
| 8,000 | 9 | 1:50 | 8 | 2:17 | 11 | 2:00 | 8 | 2:13 |
| 10,000 | 11 | 1:24 | 8 | 1:36 | 14 | 1:26 | 9 | 1:40 |

From the data in Table X, it is seen that the pretreatment according to the invention provides improved results.

In cementing wells in accordance with the invention, the "basic" cement of the invention is admixed with water, the amount depending on the API Class cement, additives such as retarders and the like may be added as desired, the cement slurry then is introduced into the well and pumped down the well into the space to be cemented, and the cement slurry is maintained in the space to be cemented until the cement sets. If desired, the "basic" cement composition may be prepared at the well site or it may be prepared at or near the well site, and the cement then combined with the mix water and such other additives as may be desired are added to the cement or to the cement slurry which is then introduced into the well. In the event amounts of water above 1 percent are used to prepare the "basic" cement composition of the invention, the "basic" cement composition should be prepared at or near the well site and used promptly after the 30 minute aging or curing period. This will prevent extended thickening times. Advantageously, however, the "basic" cement according to the invention may be prepared well in advance, if desired, and then mixed with additives and desired amounts of mix water to form the cement slurry.

Accordingly, the present invention is well adapted and suited to attain the objects and ends and has the advantages and features mentioned as well as others inherent therein.

While presently-preferred embodiments and examples have been given for the purposes of disclosure, many changes may be made therein and the invention may be applied to additional uses which are within the spirit of the invention as defined by the scope of the appended claims.

What is claimed is:

1. In a well cementing slurry containing hydraulic cement and a retarder and being suitable for cementing wells at depths down to and in excess of 20,000 feet, the improvement where,
   the hydraulic cement is intimately mixed with a small amount of liquid water insufficient to cause lumping and substantial hydration thereof, and
   aged for a period of at least 30 minutes before being slurried with mix water.

2. The invention of claim 1 where
   the small amount of water comprises from about 0.25 percent to about 5.0 percent by weight of the cement.

3. The invention of claim 1 where
   the small amount of water comprises from about 0.5 percent to about 1.0 percent by weight of the cement.

4. A retarded setting cement composition suitable for cementing wells at depths down to and in excess of 20,000 feet consisting essentially of
   a hydraulic cement intimately mixed with a small amount of liquid water insufficient to cause lumping and substantial hydration thereof, and
   aged for a period of at least 30 minutes before being slurried with mix water, and
   a retarder in an amount effective to provide a thickening time of the order of at least about 3 hours at cementing depths.

5. The invention of claim 4 where
   the small amount of water comprises from about 0.25 percent to about 5.0 percent of the cement.

6. The invention of claim 4 where
   the small amount of water comprises from about 0.5% to about 1.0% by weight of the cement.

7. An aqueous slurry of the composition of claim 4.

8. An aqueous slurry of the composition of claim 5.

9. An aqueous slurry of the composition of claim 6.

10. A method of preparing a cement composition suitable for cementing wells down to and exceeding 20,000 feet consisting essentially of,
    intimately mixing a hydraulic cement with a small amount of liquid water,
    the amount of liquid water being such that the cement is in substantially dry form without substantial lumping,
    aging the cement-water mixture for at least 30 minutes, and
    combining with the cement a retarder in an amount effective to provide a thickening time of at least about 3 hours at cementing depths.

11. The method of claim 10 where the small amount of water is from about 0.25 percent to about 5 percent by weight of the cement.

12. The method of claim 10 where the small amount of water is from about 0.5 percent to about 1.0 percent by weight of the cement.

13. A method of making a cement slurry suitable for cementing wells at depths down to and in excess of 20,000 feet consisting essentially of,
    intimately mixing a hydraulic cement with a small amount of liquid water,
    the amount of liquid water being insufficient to hydrate the cement and insufficient to form substantial lumping with the cement,
    aging the cement-water mixture for a period of at least about 30 minutes,
    then mixing the aged cement-water mixture with mix water, and
    adding a retarder in an amount effective to provide a thickening time of the cement slurry of at least about 3 hours at cementing depths.

14. The method of claim 13 where
    the small amount of water added is between about 0.25 percent to about 5 percent by weight of the cement.

15. The method of claim 13 where
    the small amount of water added is from about 0.5 percent to about 1.0 percent by weight of the cement.

16. A method of making a cement composition suitable for cementing wells consisting essentially of
    spraying a small amount of liquid water on a hydraulic cement and intimately mixing the water and the cement, and
    aging the sprayed cement for a period of at least 30 minutes.

17. The method of claim 16 where the small amount of water is from about 0.25 percent to 5.0 percent by weight of the cement.

18. The method of claim 16 where the small amount of water is from about 0.5 percent to about 1.0 percent by weight of the cement.

19. A cement composition produced by the method of claim 16.

20. A cement composition produced by the method of claim 17.

21. A cement composition produced by the method of claim 18.

* * * * *